(12) United States Patent
Dijaux

(10) Patent No.: US 9,469,398 B2
(45) Date of Patent: Oct. 18, 2016

(54) BUOYANCY SYSTEM FOR AN AIRCRAFT, AND AN AIRCRAFT

(71) Applicant: AIRBUS HELICOPTERS, Marignane (FR)

(72) Inventor: Nicolas Dijaux, Miramas (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/607,372

(22) Filed: Jan. 28, 2015

(65) Prior Publication Data

US 2015/0217862 A1 Aug. 6, 2015

(30) Foreign Application Priority Data

Jan. 31, 2014 (FR) ..................... 14 00277

(51) Int. Cl.
*B64C 25/54* (2006.01)
*B64C 25/56* (2006.01)
*B64C 25/32* (2006.01)

(52) U.S. Cl.
CPC ............... *B64C 25/54* (2013.01); *B64C 25/56* (2013.01); *B64C 2025/325* (2013.01)

(58) Field of Classification Search
CPC .. B64C 25/54; B64C 25/56; B64C 2025/325
See application file for complete search history.

(56) References Cited

U.S. PATENT DOCUMENTS

| 2,271,065 A | 1/1942 | Dornier |
| 2,702,171 A | 2/1955 | Katzenberger |
| 3,467,343 A | 9/1969 | Violleau |
| 3,996,874 A | 12/1976 | Winch |
| 4,655,415 A | 4/1987 | Miller et al. |
| 5,107,783 A | 4/1992 | Magazzu |
| 2003/0057322 A1 | 3/2003 | Parrott et al. |
| 2014/0145030 A1* | 5/2014 | Bardy ..................... B64C 25/56 244/107 |
| 2014/0252166 A1* | 9/2014 | Smith ..................... B64C 25/56 244/107 |
| 2015/0102164 A1 | 4/2015 | Delorme et al. |

FOREIGN PATENT DOCUMENTS

| CN | 1056087 A | 11/1991 |
| CN | 1876483 A | 12/2006 |
| FR | 2994686 A1 | 2/2014 |
| FR | 3011817 A1 | 4/2015 |

(Continued)

OTHER PUBLICATIONS

French Search Report for FR 1400277, Completed by the French Patent Office on Oct. 8, 2014, 6 Pages.

(Continued)

*Primary Examiner* — Valentina Xavier
(74) *Attorney, Agent, or Firm* — Brooks Kushman P.C.

(57) ABSTRACT

A buoyancy system for an aircraft, the buoyancy system being provided with at least two floats, said buoyancy system including a connection device for each float, each connection device attaching each float to a structure of an aircraft. Each connection device includes at least one stretchable connection and at least one non-stretch connection that are fastened to the float and that are suitable for being fastened to said structure, each non-stretch connection being folded while the float is against the fuselage so as to enable it to be lengthened, each non-stretch connection limiting the amplitude of the movement of the float under the effect of buoyancy thrust, and each stretchable connection exerting a return force on the float.

9 Claims, 2 Drawing Sheets

(56) References Cited

FOREIGN PATENT DOCUMENTS

| JP | 61171699 | 8/1986 |
| JP | 2010064697 | 3/2010 |
| JP | 2010064697 A | 3/2010 |

OTHER PUBLICATIONS

Chinese Office Action Dated May 23, 2016, Application No. 201510053612.1, Applicant Airbus Helicopters, 5 Pages.

* cited by examiner

BUOYANCY SYSTEM FOR AN AIRCRAFT, AND AN AIRCRAFT

CROSS REFERENCE TO RELATED APPLICATION

This application claims priority to French patent application No. FR 14 00277 filed on Jan. 31, 2014, the disclosure of which is incorporated in its entirety by reference herein.

BACKGROUND OF THE INVENTION (1) Field of the Invention

The present invention relates to a buoyancy system for an aircraft, and to an aircraft provided with a buoyancy system.

The invention is thus situated in the technical field of buoyancy systems enabling an aircraft to alight on water and enabling it to float in stable manner, and it relates more particularly to a rotary wing aircraft.

(2) Description of Related Art

Such a buoyancy system contributes to providing an aircraft with buoyancy and stability after alighting on water. The buoyancy system may be used for example as a result of forced ditching at sea, in order to enable the occupants to evacuate the aircraft. All aircraft that fly missions for transporting people over the sea are in principle provided with such a buoyancy system.

Furthermore, certification regulations specify that an aircraft must be capable of alighting and being stable on water when using its buoyancy system. Stability must be confirmed for states of the free surface of the water and for wind levels that are defined in those certification regulations.

Such surface states for the water are also referred to as "sea states" and they apply to any liquid surface. Use of the term "sea" thus also covers an aircraft alighting on any free water surface, whether at sea proper, or on a lake, for example.

A buoyancy system may comprise floats that are deployed either on command of the pilot and/or copilot, for example, or else by automatic triggering, in particular by using one or more immersion detectors. Such floats may comprise bags that are inflated by deployment means that may be explosive or electrical, for example.

Floats may be arranged in pairs. Each pair of floats thus comprises two floats arranged transversely on opposite sides of the fuselage of the aircraft. The transverse space between the two floats may be referred to for convenience as the inter-float space.

By way of example, a rotorcraft may have two pairs of floats.

Document JP 61-171699 and Document US 2003/057322 disclose a buoyancy system attached to a helicopter skid.

Such a buoyancy system may also include structural floats that are not inflatable.

Thus, the known buoyancy systems that are provided with floats that are fastened to a fuselage of an aircraft by the rigid rigging bands, i.e. that are non-stretch.

Document U.S. Pat. No. 3,467,343 describes a buoyancy system having vertical floats that are inflated by compressed air. The floats are provided with wheels that are operated by hydraulic actuators.

Furthermore, the aircraft can slope laterally under the effect of wind or waves. The floats present on the side towards which the aircraft tilts are pushed into the water, thereby increasing the righting torque exerted by the floats on the aircraft. The righting torque tends to right the aircraft.

Nevertheless, if a wave is large, the floats may become completely submerged. The righting torque then tends to decrease.

Starting from an extreme position in which the center of gravity does not overlie the inter-float space, the aircraft capsizes.

Document JP 2010 064697 (Nat Univ Yokohama) thus describes an aircraft having a fuselage and two floats. Means deform elastically in order to space the floats apart when alighting on water.

Document U.S. Pat. No. 2,271,065 (Claudius Dornier Jr) describes an aircraft having two retractable floats that are moved away from a fuselage prior to alighting on water.

Also known is Document U.S. Pat. No. 2,702,171.

BRIEF SUMMARY OF THE INVENTION

An object of the present invention is thus to provide a buoyancy system and an aircraft seeking in particular to present good stability after alighting on water.

The invention thus provides a buoyancy system for an aircraft, the buoyancy system being provided with at least two floats suitable for being arranged on either side of a fuselage of the aircraft, the buoyancy system including a connection device for each float, each connection device being suitable for attaching a float to a structure of an aircraft and for allowing the float to move relative to the fuselage.

Furthermore, each connection device includes at least one stretchable connection and at least one non-stretch connection that are fastened to the float and that are suitable for being fastened to said structure, each non-stretch connection being folded while the float is against the fuselage so as to enable it to be lengthened, each non-stretch connection limiting the amplitude of the movement of the float under the effect of buoyancy thrust, and each stretchable connection exerting a return force on the float.

In conventional manner, a stretchable connection designates rigging or a cord that can be stretched so as to become significantly longer as a result of an applied traction force, and that then exerts a return force tending to return to its initial shape when the traction force decreases or disappears.

Conversely, a non-stretch connection is used conventionally to designate rigging or a cord that does not stretch and that cannot lengthen significantly as a result of a traction force.

The use of such relative terms "stretchable" and "non-stretch" thus serves below to distinguish clearly the corresponding connections.

Under such circumstances, and after alighting on water, the floats are pressed against the fuselage of the aircraft by the stretchable connections so long as the aircraft does not tilt. The non-stretch connections are then folded so that each of them forms at least one loop, for example. In contrast, the stretchable connections can be stretched in order to exert a return force on the floats.

If the aircraft becomes inclined as a result of a violent wind or the presence of a large wave, the floats situated on the side towards which the aircraft leans become pushed underwater.

However, when the floats are completely submerged underwater, the buoyancy thrust exerted on the floats causes the floats to move relative to the fuselage. This movement is made possible firstly by the stretchable connections, given that they are stretchable, and also by the non-stretch connections. The non-stretch connections can unfold so as to allow the floats to perform a certain maximum amount of movement relative to the fuselage.

This movement of the floats increases the maximum angle to which the aircraft can tilt before capsizing.

Consequently, the system may optionally serve to optimize the stability of the aircraft when floating on regular waves by allowing greater angles of inclination. For equal buoyancy volume compared with an aircraft not including the invention, the buoyancy system enables an aircraft to survive a sea state that is more severe after ditching at sea.

In addition, the system may optionally enable floating stability to be improved on waves that are irregular by the stretchable connections damping sudden and multidirectional changes in the sheet of water.

Furthermore, alighting on water leads to large forces acting on the fittings for fastening a connection device to an aircraft. The stretchable nature of the stretchable connections and the fact that the non-stretch connections can unfold can then tend to reduce such forces on the fittings.

In addition, the risks of damage due to the impact that results from alighting on water can be reduced.

The buoyancy system may also include one or more of the following characteristics.

Each non-stretch connection presents a first extended length in the unfolded state, and each stretchable connection presents a second extended length in the absence of any force being exerted on the stretchable connection, the first extended length being longer than the second extended length.

This characteristic makes it possible to obtain a non-stretch connection that does not extend to its full length when the float is floating. When the float is underwater, the non-stretch connection can then unfold so as to allow the float to move under the effect of buoyancy thrust.

Each stretchable connection reaches a maximum length before breaking under the effect of a traction force, and each non-stretch connection presents a first extended length, the first extended length being shorter than or equal to said maximum length.

By definition, a stretchable connection can be extended up to a certain point. Beyond a breaking elongation reached when the stretchable connection is extended to said maximum length, the stretchable connection breaks.

Under such circumstances, this characteristic seeks to guarantee that the stretchable connection does not break. The margin available between the maximum length and the first extended length is determined as a function of the relative positions of the connections.

By way of example, at least one non-stretch connection and at least one stretchable connection are fastened to a common fastener point of a float.

Nevertheless, these connections may be offset. The offset can then be taken into consideration when dimensioning the buoyancy system.

In addition, at least one connection device may include at least one pair of connections comprising a non-stretch connection and a stretchable connection.

In an embodiment, each connection device includes at least two stretchable connections situated on the outside relative to two non-stretch connections.

For example, at least one connection device comprises a pair of connections constituting a "top" pair situated above a pair of connections constituting a "bottom" pair.

In another aspect, the buoyancy system includes at least one inflator for inflating the floats and at least one inflator control device connected to at least one inflator for requesting inflation of the floats. The control device may comprise conventional manual and/or automatic means. Reference may be made to the literature in order to obtain information about known control devices and inflators.

In addition to a buoyancy system, the invention provides an aircraft having a fuselage and a buoyancy system, the buoyancy system being provided with at least two floats arranged on either side of the fuselage. More particularly, the buoyancy system is a system of the invention of the type described above.

BRIEF DESCRIPTION OF THE SEVERAL VIEWS OF THE DRAWINGS

The invention and its advantages appear in greater detail from the following description of examples given by way of illustration and with reference to the accompanying figures, in which.

Elements that are present in more than one of the figures are given the same references in each of them.

DETAILED DESCRIPTION OF THE INVENTION

Figure 1:
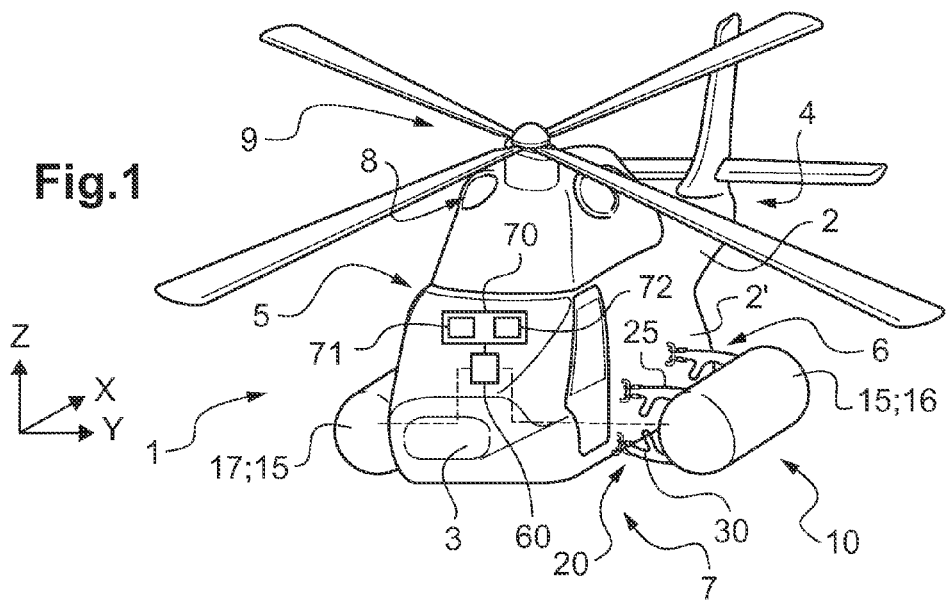
FIG. 1 is a view of an aircraft of the invention.

FIG. 1 shows an aircraft 1 of the invention.

The aircraft comprises a fuselage 2 extending lengthwise from a front end 3 to a rear end 4. In addition, the fuselage 2 extends widthwise from a right flank 5 to a left flank 6, and in elevation from a bottom portion 7 to a top portion 8.

The bottom portion is conventionally provided with landing gear, whereas the top portion 8 may carry a rotor 9 for providing lift and possibly also propulsion. The bottom portion may include a lower section defined in particular by the floor of a cabin and by the outer envelope of the fuselage.

The aircraft 1 is provided with a buoyancy system 10 of the invention in order to be able to alight on water.

Such a buoyancy system 10 is provided with at least two floats 15 arranged on either side of the fuselage 2 of the aircraft. Thus, a left float 16 is arranged beside the left flank of the aircraft, while a right float 17 is arranged beside the right flank of the aircraft.

The floats may be paired. Under such circumstances, the floats of a pair may be arranged symmetrically on either side of an anteroposterior plane of symmetry of the aircraft when the aircraft is in a stable position. For example, the aircraft shown has a single pair of floats 15.

The floats are inflatable floats. Except when alighting on water, each float may be folded up in a compartment of the aircraft, which compartment may possibly be closed in flight by a cover or the equivalent. A float then comprises an inflatable bag defined by an outer envelope.

In order to inflate the floats, the buoyancy system 10 further includes at least one inflator 60. By way of non-exclusive example, one inflator 60 may be connected to a plurality of floats 15 as shown in FIG. 1.

Furthermore, the buoyancy system is provided with at least one control device 70 for controlling at least one inflator. The control device 70 is then connected to at least one inflator 60 in order to request inflation of the floats 15.

The control device 70 may be provided, in conventional manner, with a manual control system 71 and/or with an automatic control system 72.

Furthermore, the buoyancy system has one connection device 20 per float for attaching the float to a structure 2' of the aircraft 1.

Each connection device 20 is provided with at least one stretchable connection 25 that is fastened firstly to the associated float 15 and secondly to the structure 2'. Furthermore, the connection device 20 possesses at least one non-stretch connection 30 that is fastened firstly to the associated float 15 and secondly to the structure 2'.

The connection device enables the float to move under the effect of pressure from a liquid away from a "normal" position in which the float is close to the fuselage, and for example close to the compartment that houses the float when it is not inflated.

For this purpose, each stretchable connection 25 of a float tends to position the float 15 in this normal position. In addition, in the normal position, each non-stretch connection 30 is folded and therefore has the potential of being unfolded so as to be lengthened and leaves the float free to move. Likewise, the elastic nature of each stretchable connection confers on the stretchable connection freedom to stretch.

Figure 2:
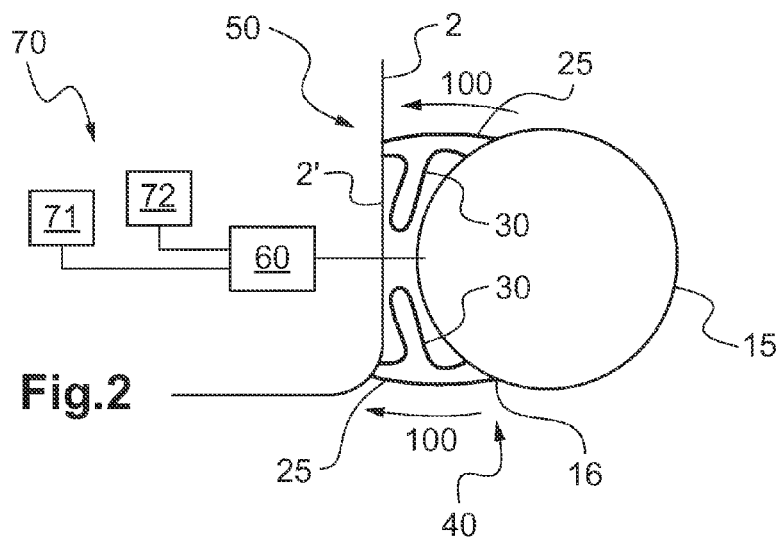
FIG. 2 shows a float attached to an aircraft by two pairs of connections of the invention.

FIG. 2 shows a float in such a normal position. The float is offset a little from the fuselage 2, but it could be touching the fuselage in this position.

In this embodiment, the stretchable connections 25 and the non-stretch connections 30 are arranged in pairs.

The connection device 20 may have at least one pair of connections comprising a non-stretch connection 30 and a stretchable connection 25.

For example, at least one connection device 20 comprises a pair of connections referred to as a "top" pair 50 that is situated above a pair of connections referred to as a "bottom" pair 40 in order to optimize retention of the float.

More precisely, the connection device 20 has at least two stretchable connections 25 situated externally relative to two non-stretch connections 30.

Furthermore, at least one non-stretch connection 30 and at least one stretchable connection 25 may be fastened to a common fastener point 16 on a float 15 and/or to a common fastener point on the structure 2' by fittings or the like.

Figure 3:
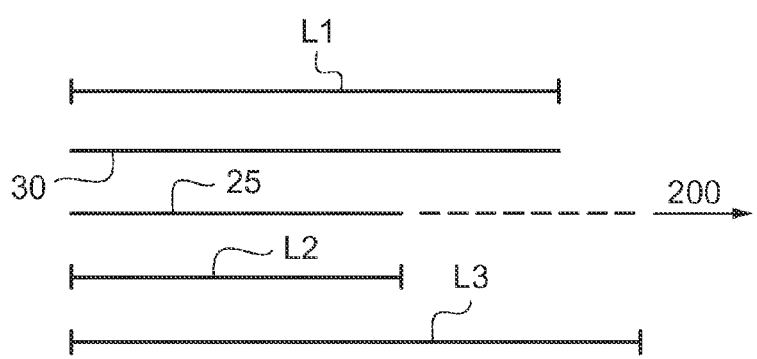
FIG. 3 is a diagram for explaining the lengths of the connections.

With reference to FIG. 3, each non-stretch connection 30 presents a first extended length L1 in the deployed state. This non-stretch connection is not stretchable and therefore cannot be lengthened to possess a length greater than the first extended length L1.

Furthermore, each stretchable connection 25 presents a second extended length L2 in the absence of any force 200 being exerted on the stretchable connection 25.

Consequently, the first extended length L1 is longer than the second extended length L2. As a result, the non-stretch connection may be folded in the normal position.

In contrast, each stretchable connection 25 may reach a maximum length L3 before breaking under the effect of a fraction force 200. This maximum length L3 is determined to enable each non-stretch connection to reach the first extended length L1, for example.

Thus, the first extended length L1 may optionally be less than or equal to the maximum length L3.

Figure 4:
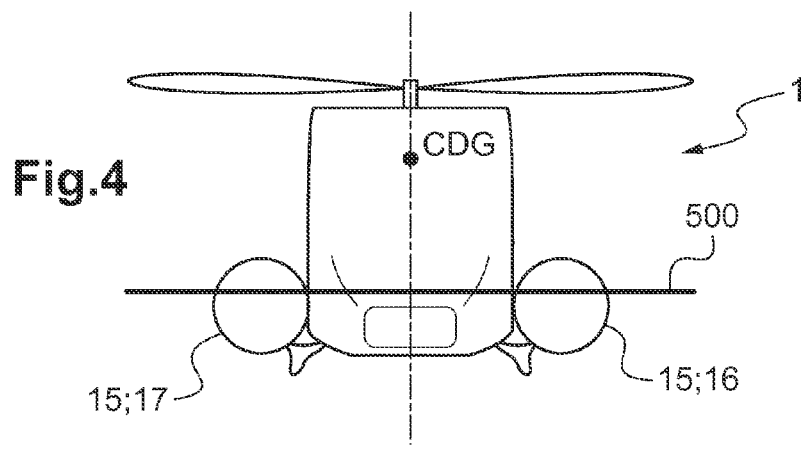
FIGS. 4 to 6 are diagrams explaining the operation of the invention.
Figure 5:
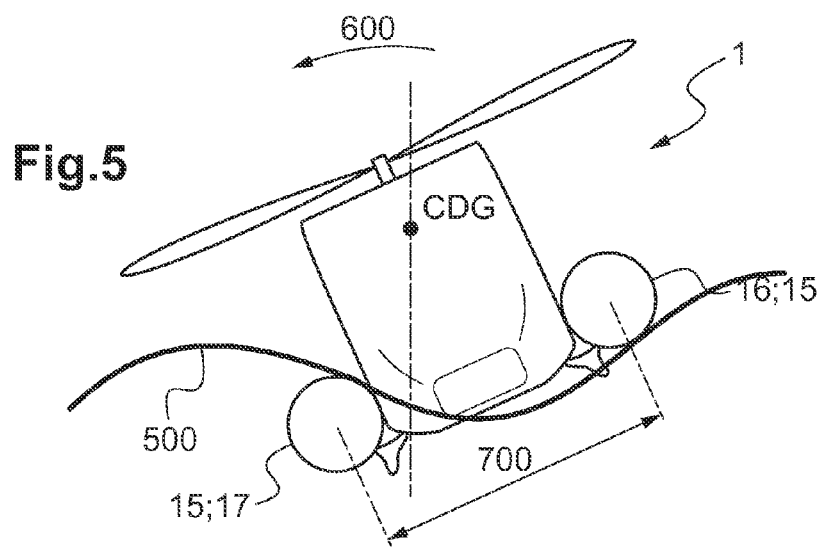
Figure 6:
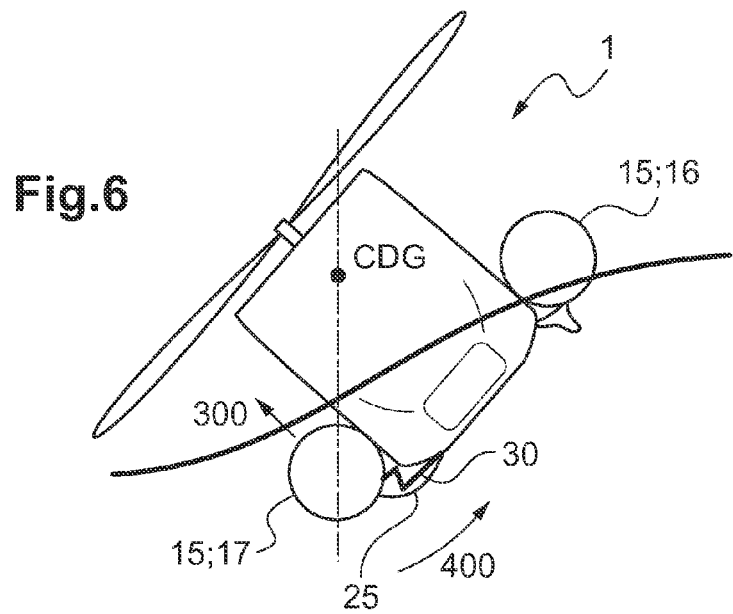

FIGS. 4 to 6 explain the operation of the invention.

FIG. 4 shows a situation in which the liquid surface 500 is calm. The floats are then in the normal position, and the aircraft is consequently stable.

With reference to FIG. 5, when the liquid surface 500 is rough or when in the presence of a squall, the aircraft may tilt towards one side as represented by arrow 600, e.g. towards the left side. The floats present on this side may then be pushed under the liquid surface. So long as the center of gravity CDG remains over the inter-float space 700, the aircraft remains afloat.

With reference to FIG. 6, if the angle of inclination is large, floats can be moved so as to be completely underwater.

In the state of the art, that situation can lead to capsizing.

Nevertheless, in the invention, the buoyancy thrust exerted on the floats that are under the liquid surface causes the floats in question to move towards the surface along arrow 300. This movement is made possible by the stretchable connections 25, which stretch, and by the non-stretch connections 30, which unfold.

This characteristic can thus offset the limit on the angle of inclination that leads to capsizing.

In addition, each stretchable connection exerts a return force 400 urging the float back towards its normal position and thus tending to right the aircraft.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A buoyancy system for an aircraft, the buoyancy system being provided with at least two floats suitable for being arranged on either side of a fuselage of the aircraft, said buoyancy system including a connection device for each float, each connection device being suitable for attaching a float to a structure of an aircraft and for allowing the float to move relative to the fuselage, wherein each connection device includes at least one stretchable connection and at least one non-stretch connection that are fastened to the float and that are suitable for being fastened to said structure, each non-stretch connection being folded while the float is against the fuselage so as to enable it to be lengthened, each non-stretch connection limiting an amplitude of a movement of the float under an effect of buoyancy thrust, and each stretchable connection exerting a return force on the float.

2. A buoyancy system according to claim 1, wherein each non-stretch connection presents a first extended length in an unfolded state, and each stretchable connection presents a second extended length absent any force being exerted on the stretchable connection, said first extended length being longer than said second extended length.

3. A buoyancy system according to claim 1, wherein each stretchable connection reaches a maximum length before breaking under a traction force, and each non-stretch connection presents a first extended length, said first extended length being shorter than or equal to said maximum length.

4. A buoyancy system according to claim 1, wherein at least one non-stretch connection and at least one stretchable connection are fastened to a common fastener point of a float.

5. A buoyancy system according to claim 1, wherein each connection device includes at least two stretchable connections situated on the outside relative to two non-stretch connections.

6. A buoyancy system according to claim 1, wherein at least one connection device include at least one pair of connections comprising a non-stretch connection and a stretchable connection.

7. A buoyancy system according to claim 1, wherein at least one connection device comprises a pair of connections constituting a "top" pair situated above a pair of connections constituting a "bottom" pair.

8. A buoyancy system according to claim 1, wherein said buoyancy system includes at least one inflator for inflating said floats and at least one inflator control device connected to at least one inflator for requesting inflation of the floats.

9. An aircraft having a fuselage and a buoyancy system, the buoyancy system being provided with at least two floats arranged on either side of the fuselage, wherein said buoyancy system is a system according to claim 1.

\* \* \* \* \*